Figure 1:
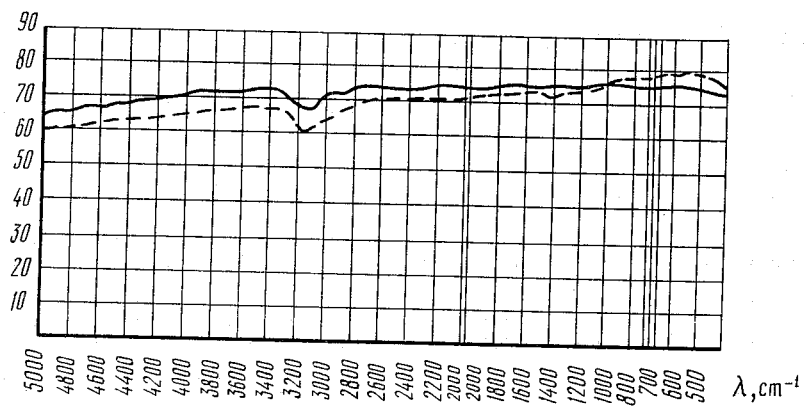

INVENTORS
Marianna P. Shaskolskaja
Georgy F. Dobrzhansky
BY Glascock, Downing & Seebold
ATTORNEYS

United States Patent Office 3,362,797
Patented Jan. 9, 1968

3,362,797
STABILIZING SILVER CHLORIDE CRYSTALS WITH MERCURIC CHLORIDE ADDITIVE
Marianna Petrovna Shaskolskaja and Georgy Fedorovich Dobrzhansky, Moscow, U.S.S.R., assignors to Moskovsky Institute Stali i Splavov and Institute Kristallografii, Moscow, U.S.S.R.
Filed May 21, 1964, Ser. No. 369,065
1 Claim. (Cl. 23—300)

The present invention relates to the change of physical properties of an optical material and, in particular, to the alloying of crystalline silver chloride with small quantities of admixtures resulting in stabilizing silver chloride to the effect of solar radiation activity and in increasing considerably its strength.

Crystalline silver chloride is one of the most transparent materials in the visible and infra-red regions of the spectrum easily responding to mechanical treatment; it is used for manufacturing optical articles, such as: prisms, lenses, etc. Silver chloride is similar to metals as far as its mechanical characteristics are concerned, thus making it possible to use it as a model material when modeling processes of plastic deformation in order to study the distribution of strain in sample by a photoelasticity method.

Silver chloride is also known to be easily grown in the form of large monocrystals.

The high sensitivity of silver chloride to solar radiation is its principal shortcoming which prevents its wide use in engineering. When acted upon by visible and, especially by ultra-violet light silver chloride rapidly darkens and loses its transparency with respect to visible and infra-red rays.

Another shortcoming of silver chloride is its low strength.

Special protective coatings (sulfur, selenium, etc.), proposed to preserve articles made of silver chloride from decomposition under the action of solar radiation, do not strongly adhere to their surfaces; moreover, such coatings considerably raise the price of the articles of silver chloride, on account of which their use in engineering becomes complicated.

There are well-known papers which describe the changes of the mechanical properties of silver chloride as a result of adding admixtures to it. Articles by Caliotty (Chemical Abstracts, 1935, 29, 7145), Coops (Optic, 1948, 3, 298), Lueman and Gorume (Acta Metallurgica, 1959, 07, 685), Stocks and Lee (Acta Metallurgica, 1962, 10; 535) describe the influence of alloying AgCl on increase of its hardness or strength.

However, along with the increase of its hardness and strength, a decrease of transparency has always been observed.

In order to make possible the use of crystalline silver chloride as an optical material and as a model material, it is necessary to eliminate its tendency to decompose under the influence of solar radiation and to increase its mechanical properties as far as possible.

The object of the present invention is to obtain on the basis of AgCl an optical and model material which would be transparent in the visible and infra-red regions of the spectrum, stable to the influence of solar radiation and stronger as compared with pure silver chloride.

By the present invention is has been ascertained that when AgCl is alloyed with small quantities of mercuric chloride, it completely stabilizes AgCl to the effect of solar radiation and increases its strength.

The material as obtained by this invention, can be utilized in manufacturing lenses, prisms, cuvettes, light conductors and other optical articles, as well as in modeling the plastic deformation of monocrystalline and polycrystalline materials in order to study strain distribution within the volume of the material by the photoelasticity method, etc.

Figure 2:
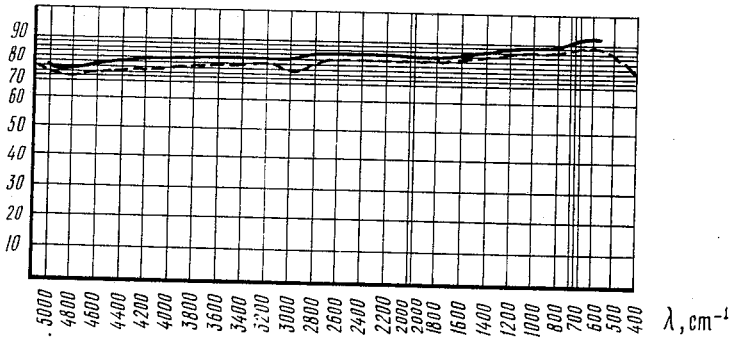
Figure 3:
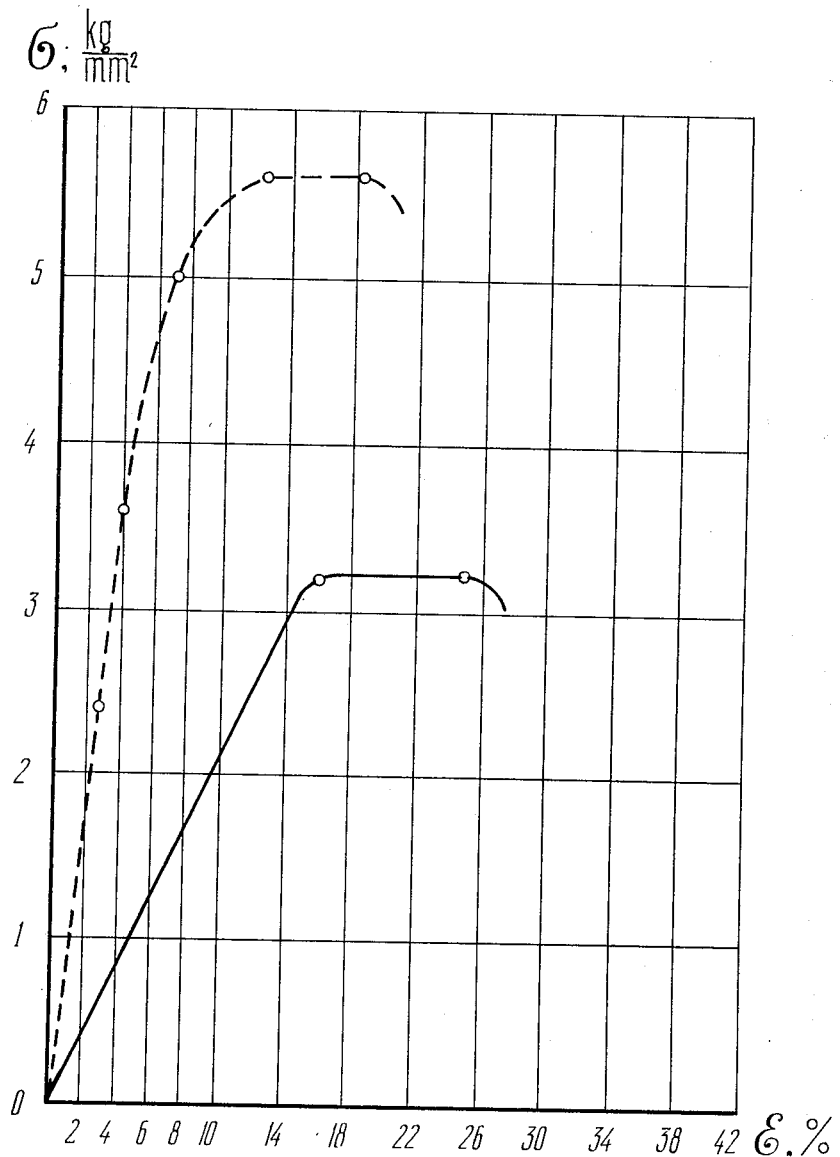

The proposed invention can be illustrated by transmission and extension curves, as presented in FIGS. 1, 2 and 3.

FIGURE 1 shows transmission curves for a plate made of AgCl crystals alloyed with 0.005 wt. percent mercuric chloride and exposed to sun light for three months (dotted line), and for similar plate made of pure AgCl crystals which were not exposed to sun light (continuous line).

FIGURE 2 shows transmission curves for a plate made of AgCl crystals alloyed with 0.25 wt. percent mercuric chloride and exposed to sun light for four months (dotted line), and for similar plate made of pure AgCl crystals which were not exposed to sun light (continuous line). For the above two figures, the wave lengths expressed in inverse centimeters are plotted along the abscissa and the transmission factor in percent, along the ordinate axes.

FIGURE 3 shows stress-strain curves AgCl crystals; pure AgCl—continuous lines, AgCl alloyed with 0.01 wt. percent $HgCl_2$—dotted line. Percent elongation is plotted along the abscissa axis, while the stress in kg./mm.$^2$, along that of the ordinate.

Comparing the curves in FIG. 1 and FIG. 2, we may observe that a prolonged exposure to the visible and ultraviolet rays does not change the light transmittance of the proposed material within the visible and infra-red regions of the spectrum. Thus, the material is quite resistant to the action of the visible and ultra-violet rays.

Comparing the curves in FIG. 3 we may conclude that the strength properties of the alloyed crystals are considerably higher than those of the pure crystals.

It has been established that:

(1) The crystallization process is not changed if 0.005–0.25 wt. percent of mercuric chloride is added to the initial charge of pure silver chloride. Powder-like mercuric chloride is added to the initial charge of chemically pure silver chloride before crystallization process begins.

Crystals are grown by the known methods in ampules, placed in vertical tubular ovens. Inside the oven is maintained the temperature gradient. Gradually sinking, the ampule with its melted contents passes through the highest temperature zone, which is about 470° C., where the temperature is higher than the melting point of AgCl. As the ampule emerges from the maximum temperature zone, its content gradually crystallizes. The sinking velocity of the ampule is determined by the diameter of the growing crystal.

At the end of the crystallization process, the crystal undergoes the isothermal annealing at the temperature of 300–400° C. AgCl crystals, having the additions of mercuric chlorides, should be grown in soldered ampules. An alloyed crystal can be easily detached from the walls of the ampule.

(2) Mercuric chloride can be added to AgCl crystals by the surface diffusion method.

(3) AgCl crystals, alloyed with mercury, can be processed by methods similar to those used for the treatment of pure silver chloride, i.e. rolling, punching, drawing, optical polishing, etc.

(4) AgCl crystal containing an admixture of $HgCl_2$ is resistant to the ultra-violet and visible radiations. The transmission of the alloyed crystal in the infra-red and visible regions does not change as a result of exposure to ultra-violet rays.

A silver chloride plate alloyed with mercury permits 70–80 percent of the infra-red rays to pass through it both before and after the prolonged ultra-violet exposure.

(5) AgCl crystals alloyed with mercury are 1.5–2 times as strong as pure non-alloyed crystals.

It is to be understood that there is no change in the essence of the invention by: a change of the mercury admixture as regards to its weight and percentage composition; the usage of any other mercury salt instead of mercuric chloride; a change of crystal growing and alloying or a change of any other of its characteristics.

*Examples*

(1) The addition of 0.01 wt. percent mercuric chloride increases the crystal strength by a factor of 1.7 as compared with the non-alloyed AgCl. Stress-strain curves of the pure and the alloyed AgCl crystals of 0.01 wt. percent mercuric chloride are shown in FIG. 3.

(2) The addition of 0.005 wt. percent mercuric chloride does not change the transmission curves of silver chloride, and the crystal maintains its stability throughout the prolonged solar radiation.

FIG. 1 shows a transmission curve (dotted line) of a plate made of AgCl crystals alloyed with 0.005 wt. percent mercuric chloride and acted upon by solar radiation for three months. This curve is practically the same as that of a plate made of the non-alloyed and non-exposed AgCl (continuous line).

(3) The addition of 0.25 wt. percent mercuric chloride does not change the AgCl transmission curve either; the crystal continues to remain impermeable to solar radiation.

FIG. 2 shows a transmission curve (dotted line) of a plate made of AgCl crystals alloyed with 0.25 wt. percent mercuric chloride and exposed to the ultra-violet and visible rays over a long period of time.

In the visible and infra-red regions of the spectrum a transmission curve of the plate is practically the same as that of the non-alloyed and non-exposed silver chloride (continuous line).

The above-given examples illustrate the invention without restricting its scope.

Thus, the present invention makes it possible to obtain material, transparent in the visible and infra-red regions of the spectrum, easily grown in the shape of large monocrystals and also easily responding to optical treatment without being decomposed by the light exposure.

What we claim is:

1. The method of rendering articles consisting of crystalline silver chloride stable to the effect of solar radiation and of increasing the strength of said articles without diminishing their transmittance in the visible and infra-red regions of the spectrum which comprises adding between 0.005 and 0.25% by weight of finely divided mercuric chloride powder to silver chloride before it is crystallized, heating the mixture to a temperature sufficient to melt the silver chloride, and then cooling sufficiently for the silver chloride to crystallize with the mercuric chloride distributed therein.

References Cited

UNITED STATES PATENTS

| | | | |
|---|---|---|---|
| 3,219,449 | 11/1965 | Saxe | 96—44 |
| 3,219,452 | 11/1965 | Hartouni | 96—94 |
| 2,728,664 | 12/1955 | Carroll | 96—110 |
| 2,728,667 | 12/1955 | Knot | 96—110 |

WILBUR L. BASCOMB, JR., *Primary Examiner.*

NORMAN YUDKOFF, *Examiner.*

G. HINES, *Assistant Examiner.*